Sept. 1, 1959   E. H. MUND   2,902,003
LIVESTOCK FEEDER
Filed Nov. 19, 1957

Elgin H. Mund
INVENTOR.

United States Patent Office 2,902,003
Patented Sept. 1, 1959

2,902,003

LIVESTOCK FEEDER

Elgin H. Mund, Fredericksburg, Tex.

Application November 19, 1957, Serial No. 697,432

4 Claims. (Cl. 119—52)

This invention relates to a poultry or livestock feeder.

An object of the invention is to provide a practical livestock feeder which may be made of any length and which holds a large quantity of grain or feed. The feeder provides excellent protection from rain and weather and may be constructed very economically with little or no waste in the manufacture.

My feeder has several important advantages over all others of which I am aware. I have enough overhang to keep rain from blowing onto the feed or grain. I place a one inch double lip on the feeder trough to provide strength and also to keep chickens and turkeys from raking the feed out with their beaks. In addition, I place a V or 90° break in the bottom of the trough because chickens and turkeys are debeaked. They are better able with the 90° break at the bottom of the feeder, to clean out the trough.

The bottom construction of my feeder is of importance. It is arranged so that all of the feed will slide out by gravity. My feeder is suitable for young chickens and pullets and by lifting it from the ground, as by applying it on a skid, it is used by more mature and larger poultry.

These together with other objects and advantages which will become subsequently apparent reside in the details of construction and operation shown and described, and accordingly, all suitable modifications and equivalents may be resorted to, falling within the scope of the invention as claimed.

In the accompanying drawing there is a feeder 10 which is disposed on a skid 12. The skid is made of a pair of sides 14 and 16 connected together by a pair of cross members 18 and 20. It is on these cross members that my feeder is placed. This elevates the feeder from the ground surface bringing it out of reach of the very small chickens. For them, it is placed lower.

Figure 1:
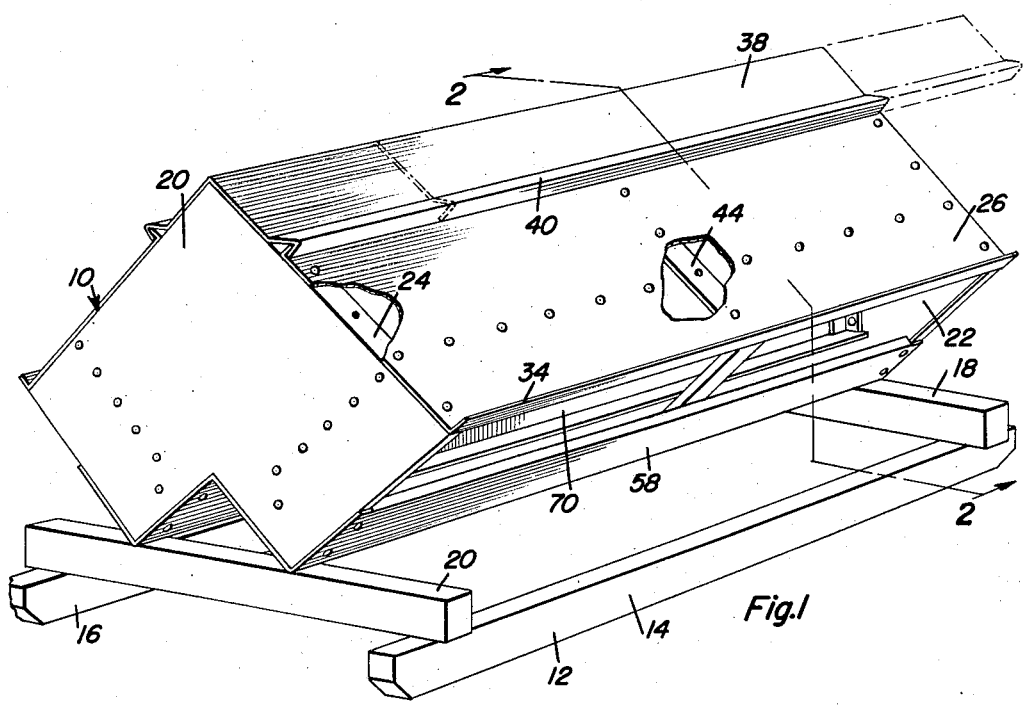
Figure 1 is a perspective view of a feeder constructed in accordance with my invention.
Figure 2:
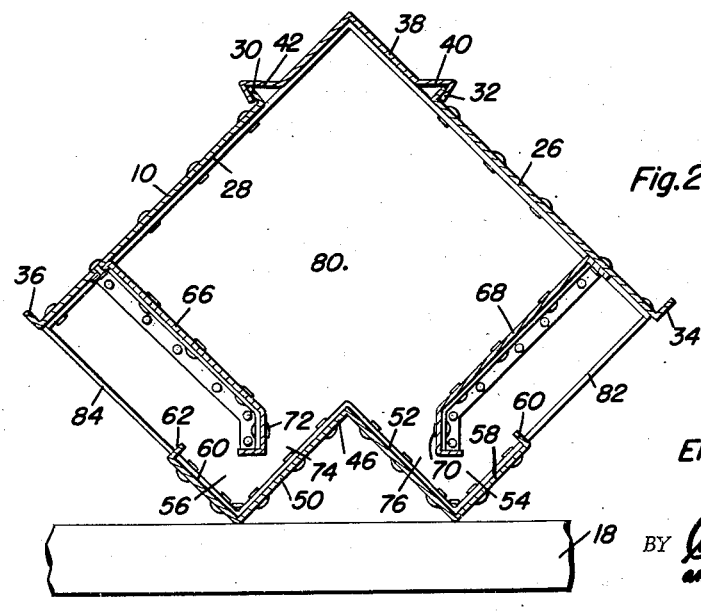
Figure 2 is a cross-sectional view taken on the line 2—2 of Figure 1.

Feeder 10 is made of a pair of end walls 20 and 22 whose edges are turned inward, for example see edge 24 of end wall 20. Top panels 26 and 28 are riveted or otherwise secured to the inturned edges of ends 20 and 22 and they have outward flanges 30 and 32 (Figure 2) at their upper longitudinal edges. Their lower longitudinal edges also have outturned flanges 34 and 36 which function as rain shields. The upper flanges 30 and 32 are rails that constitute a track for the V-shaped sliding door 38. This V-shaped sliding door has its apical portion disposed on the upper pointed ends of the walls 20 and 22 and has downwardly opening pockets 40 and 42 formed by longitudinal bends at the longitudinal edges thereof. The sliding door is capable of moving fore and aft in order to open the feeder 10 from the top. This is shown in dotted line in Figure 1. The panels 36 and 28 are supported intermediate their ends by an angle iron frame 44 not only lending support to the panels 26 and 28 but also to the entire structure as a whole.

The bottom 46 of feeder 10 is made by a downwardly opening V-member provided with panels 50 and 52 joined together at their upper longitudinal edges. This constitutes a deflector for the feed to assure that it will flow into pockets 54 and 56 formed by panels 50, 52 and sides 58 and 60. These sides form a continuation of panels 52 and 50 and form upwardly opening V-shaped pockets within which to accommodate grain, feed, etc. Inwardly directed flanges 60 and 62 are at the edges of sides 58 and 60 to rigidify the construction and also to prevent the fowl from raking the grain or feed out of pockets 54 and 56 and onto the ground. In order to hold the bottom 46 and the sides 58 and 60 firmly anchored, the angle iron frame 44 is attached to them, and their ends are riveted or otherwise secured to the end walls 20 and 22.

Angulated deflectors 66 and 68 are riveted or otherwise secured to the panels 26 and 28 and to the ends or end walls 22 and 20. The deflectors 66 and 68 have flanges on their periphery by which to form anchoring areas to accommodate the rivets or like fasteners. They extend parallel to the sides 58 and 60 until they reach a point where they enter pockets 54 and 56. At generally the center of the pockets, they are arranged with the break downward and form approximately vertical deflectors 70 and 72 of the lower ends thereof. These form passageways 74 and 76 through which the grain from compartment 80 which is enclosed generally by walls of the feeder 10, may flow.

It is understood that various changes may be made in the construction and use of the invention without departing from the following claims. It is also apparent that it is easy to load my feeder by simply moving the sliding door 38 and emptying the feed or grain into the top of the compartment 80. It will remain in this compartment and flow gradually through the passageways 74 and 76 into the feeding pockets 54 and 56. By having the entrances 82 and 84 angulated (Figure 2), sufficient overhang is formed to prevent the feed from becoming wet during rainstorms. The gutters that are constructed by flanges 34 and 36 help considerably.

What is claimed as new is as follows:

1. In a feeder, the combination of a pair of end walls, top panels secured to said end walls and arranged at approximately 90° to each other, a pair of rails at a pair of longitudinal edges of said panels, said rails constituting a track, a top sliding door operatively connected to said track, a compartment enclosed at least in part by said end walls and door and accessible through said sliding door, a bottom having panels arranged in downwardly open V-shape and sides arranged at angles to each other and joined to the outer longitudinal edges of said panels and forming upwardly opening feed pockets, said bottom secured to said end walls, portions of said sides of said pockets being at approximately right angles to said top panels and constituting parts of the side walls of the feeder and having entrances therein, a strengthening flange along the lower edge of said entrances and preventing grain from being raked onto the ground, a deflector in each pocket and extending upwardly therefrom, said deflector having a part which is approximately parallel to one entrance and a part which penetrates inwardly of one pocket, said part which penetrates inwardly of the pocket spaced from the side and the panel of the pocket to form a passageway which registers with said compartment.

2. The feeder of claim 1 wherein there is a skid on which the feeder is located.

3. The feeder of claim 1 wherein there is a rain gutter at the lower edges of said side panels, and wherein there is a strengthening frame connected to said end walls and to a portion of the sides and panels forming said pockets.

4. In a feeder, the combination of a pair of end walls, top panels secured to said end walls and arranged at approximately right angles to each other, a bottom attached to said end walls and consisting essentially of a pair of panels joined along confronting longitudinal edges to form a downwardly opening approximately V-shaped member, a pair of sides attached to the outer longitudinal edges of said panels and arranged at approximately right angles to said panels to form a pair of upwardly opening feed pockets, said sides constituting a portion of the sides of the feeder and having entrances therein, said sides being at approximately right angles to said top panels, a pair of deflectors extending approximately parallel to said sides and opposing said entrances to prevent feed from spilling through said entrances and to direct the feed into said upwardly opening feed pockets, the lower edges of said deflectors being spaced from said pocket walls and panels to provide a passageway through which feed may flow into the bottom of said feed pockets.

References Cited in the file of this patent

UNITED STATES PATENTS

| | | |
|---|---|---|
| 1,121,502 | Hornbeck | Dec. 15, 1914 |
| 1,346,784 | Hamilton | July 13, 1920 |
| 1,395,307 | Stuart | Nov. 1, 1921 |
| 1,561,644 | Hanson | Nov. 17, 1925 |
| 1,836,488 | Munson | Dec. 15, 1931 |
| 2,454,721 | Severance et al. | Nov. 23, 1948 |